(12) United States Patent
Herman

(10) Patent No.: US 6,371,614 B1
(45) Date of Patent: Apr. 16, 2002

(54) HIGHLY-COMPACT EYEGLASSES

(75) Inventor: Pat Herman, Aptos, CA (US)

(73) Assignee: Eyes For You, Inc., Aptos, CA (US)

( * ) Notice: Subject to any disclaimer, the term of this patent is extended or adjusted under 35 U.S.C. 154(b) by 0 days.

(21) Appl. No.: 09/603,465

(22) Filed: Jun. 22, 2000

Related U.S. Application Data

(60) Provisional application No. 60/141,089, filed on Jun. 25, 1999.

(51) Int. Cl.$^7$ ................................................. G02C 5/06
(52) U.S. Cl. ........................................ 351/126; 351/124
(58) Field of Search ................................ 351/124, 126, 351/41

(56) References Cited

U.S. PATENT DOCUMENTS

| | | |
|---|---|---|
| 1,978,486 A | 10/1934 | Coombs et al. |
| 2,004,445 A | 6/1935 | Meyer |
| 2,098,513 A | 11/1937 | Nerney |
| 2,140,044 A | 12/1938 | Beattie |
| 5,015,087 A | 5/1991 | Baratelli |
| D322,262 S | 12/1991 | Manus |
| 5,274,404 A | * 12/1993 | Michael ................. 351/126 |

* cited by examiner

Primary Examiner—Hung Xuan Dang

(57) ABSTRACT

Highly compact eyeglasses include a first lens portion and a second lens portion coupled via a bridge wire. Each lens portion includes an optical section, and may further include a transition section. The optical section may be characterized by a reference surface and an adjustment surface. From one pair of eyeglasses to another, the reference surface exhibits a constant curvature. The curvature of an adjustment surface is designed or chosen relative to the curvature of a reference surface to provide a lens portion associated with a particular overall dioptic power. The transition section may include a corrugation and/or a lip to aid in securing the glasses to a wearer's nose. The bridge wire serves as a type of spring that couples or interconnects the lens portions, where the spring includes and/or exhibits positional memory properties. The bridge wire may include bent or curved end segments, which may be embedded within the lens portions during a manufacturing process. The bridge wire may further include an indentation segment, which may provide a secure holding region or section during manufacture, and which may additionally help to maintain the eyeglasses in a given position upon a wearer's nose.

28 Claims, 4 Drawing Sheets

| | Radius | X | Y |
|---|---|---|---|
| RR1 | 0.585 | -1.077 | 0.0 |
| RR2 | 0.531 | -1.131 | -0.004 |
| RR3 | 0.200 | -0.417 | 0.378 |
| RR4 | 0.250 | -0.442 | 0.020 |

| LL2 | Angle: 206.10 |
| LL3 | Angle: 184.00 |

| | Radius | X | Y |
|---|---|---|---|
| R1 | 0.585 | 1.077 | 0.0 |
| R2 | 0.531 | 1.131 | -0.004 |
| R3 | 0.200 | 0.417 | 0.378 |
| R4 | 0.250 | 0.442 | 0.020 |
| R6 | 0.413 | 0.0 | 0.423 |
| R7 | 0.430 | 0.0 | 0.425 |

| L2 | Angle: 333.90 |
| L3 | Angle: 356.00 |

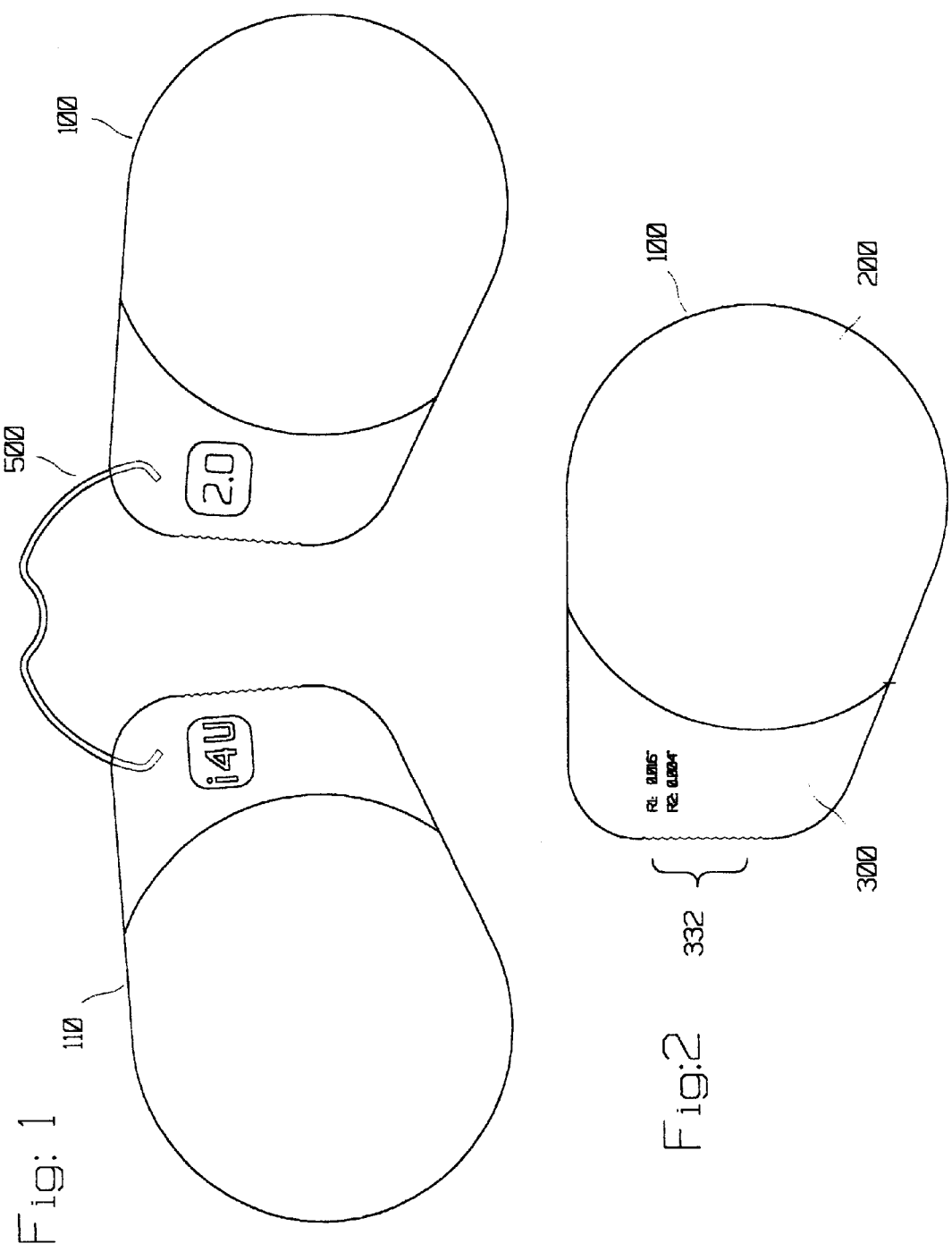

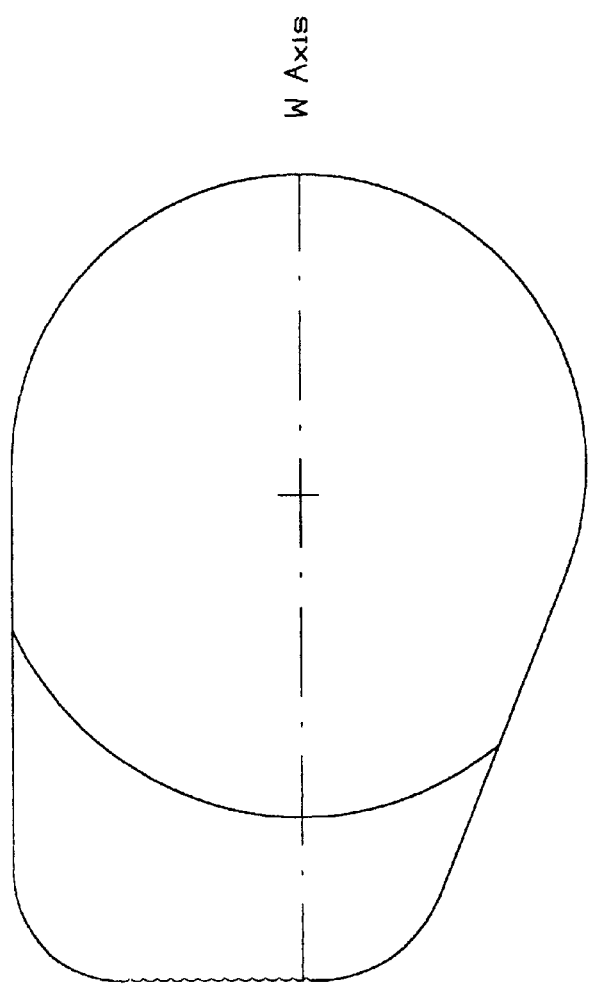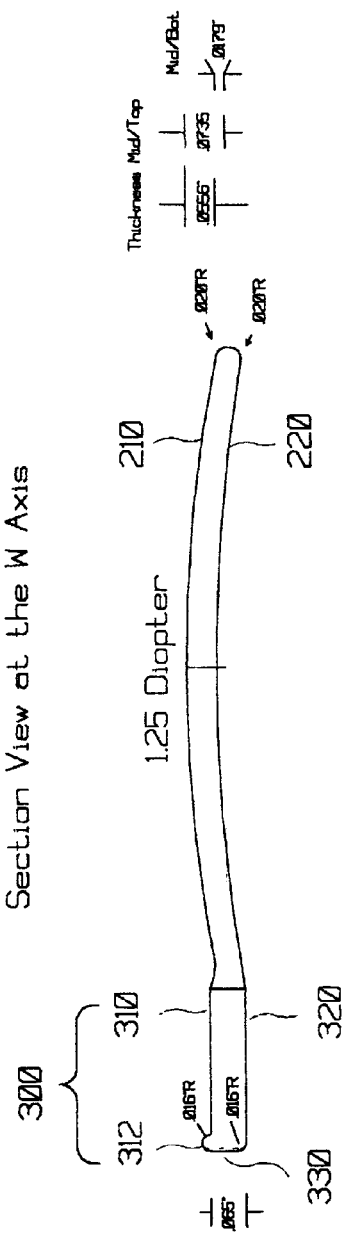
Fig. 3

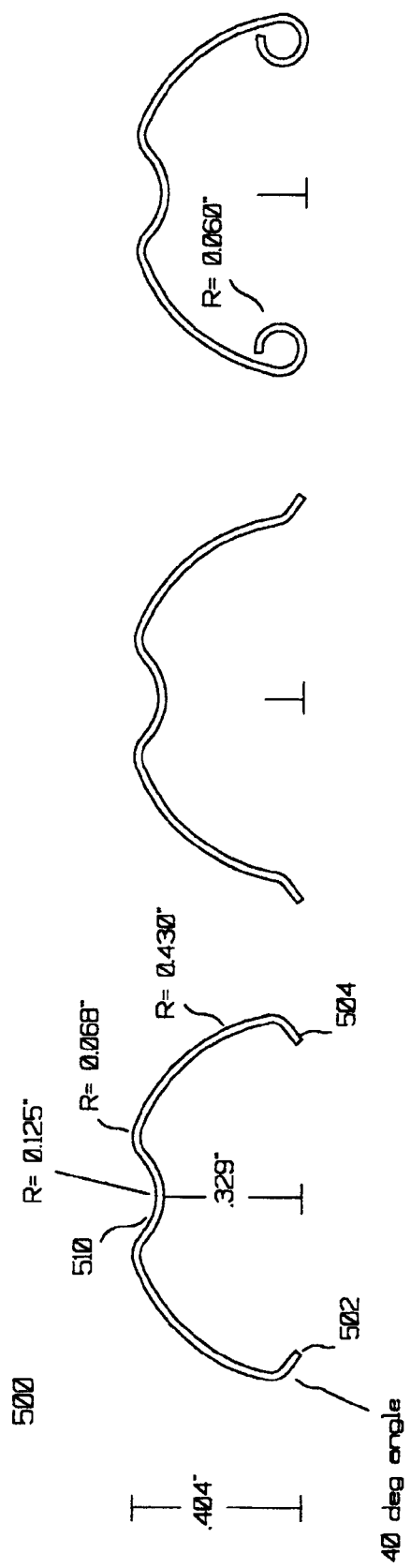

Fig: 5
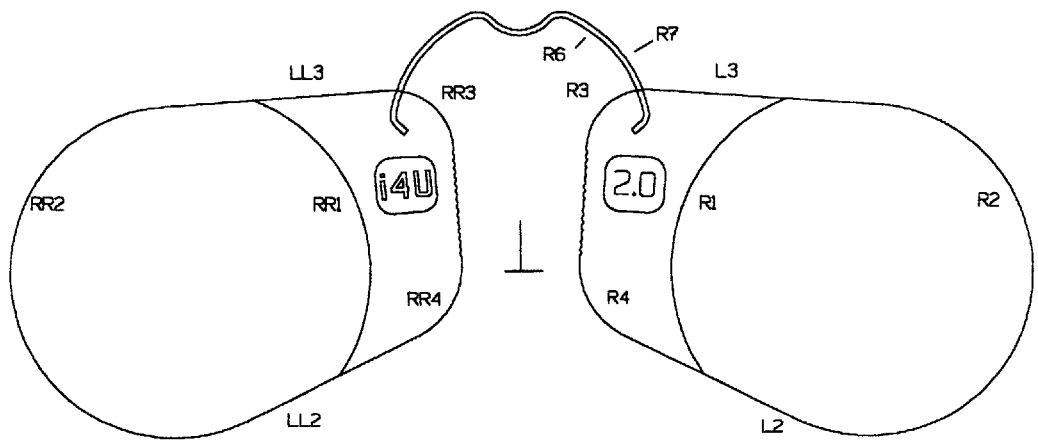
|  | Radius | X | Y |
|---|---|---|---|
| RR1 | 0.585 | -1.077 | 0.0 |
| RR2 | 0.531 | -1.131 | -0.004 |
| RR3 | 0.200 | -0.417 | 0.378 |
| RR4 | 0.250 | -0.442 | 0.020 |
| LL2 | Angle: 206.10 | | |
| LL3 | Angle: 184.00 | | |
|  | Radius | X | Y |
|---|---|---|---|
| R1 | 0.585 | 1.077 | 0.0 |
| R2 | 0.531 | 1.131 | -0.004 |
| R3 | 0.200 | 0.417 | 0.378 |
| R4 | 0.250 | 0.442 | 0.020 |
| R6 | 0.413 | 0.0 | 0.423 |
| R7 | 0.430 | 0.0 | 0.425 |
| L2 | Angle: 333.90 | | |
| L3 | Angle: 356.00 | | |

HIGHLY-COMPACT EYEGLASSES

This application claims the benefit of provisional application No. 60/141,089, filed Jun. 25, 1999.

BACKGROUND OF THE INVENTION

Highly-compact eyewear can provide great convenience, and may additionally prove useful in critical situations when conventional eyewear has been lost, misplaced, or forgotten. Compact eyeglasses should meet several requirements. In particular, compact eyeglasses should be very small in size, such that the eyeglasses are as small as possible while still providing good optical performance. Compact eyeglasses should also have thin lenses, even when the lenses provide a high level of magnification. Additionally, compact eyeglasses should provide a wearer with a secure, yet comfortable fit, and should be easily adjustable to accommodate variations in facial structure. Also, compact eyeglasses should provide a high level of durability and damage resistance. Compact eyeglasses should further be manufacturable via simple, robust techniques. Finally, compact eyeglasses should be inexpensive. Unfortunately, prior compact eyeglasses fail to adequately meet the aforementioned requirements.

SUMMARY OF THE INVENTION

The present invention provides highly-compact eyeglasses that readily meet the aforementioned needs. The present invention comprises a first lens portion and a second lens portion that are coupled via a bridge member or wire. The lens portions may be right- and left-side versions of each other. Each lens portion may include an optical section that provides desired refractive, magnifying, and/or light-focusing characteristics; and a transition section that may serve as an interface between the optical section and the bridge wire, and which may further provide a gripping region that ensures a secure fit against or upon a wearer's nose. The optical and transition sections may be comprised of a single, contiguous piece of material such as polycarbonate, which may facilitate ease of manufacturability.

The optical section may include a reference surface characterized by a reference curvature; and an adjustment surface characterized by a curvature that is designed or selected relative to the reference curvature to provide the optical section with a desired dioptic power. The transition section may include an upper surface, a lower surface, and an edge. In one embodiment, the distance between the transition section's lower surface and a peak or top of the optical section's reference surface is independent or essentially independent (relative to manufacturing process variation, for example) of the lens portion's optical characteristics.

The transition section's upper surface may include a lip or rim that can aid in securing a lens portion to a wearer's nose in a comfortable manner. Additionally, the transition section's edge may include a corrugated or roughened section or segment, which can further aid in comfortably securing the present invention to a wearer's nose. The lip and/or the corrugated section may eliminate the need for nose pads found on other types of eyewear, thus enhancing the compactness and durability of the present invention.

The bridge wire may serve as a type of flat spring that couples the first and second lens portions. The bridge wire may exhibit a memory relative to positional displacement. As the bridge wire may be readily spread and/or contracted, the bridge wire facilitates adjustment of the distance between the first and second lens portions, and helps support the eyeglasses upon a wearer's nose. In one embodiment, the bridge wire comprises a generally m-shaped piece of thin wire having a circular cross section, and which includes a first end segment, a first arm segment, a second end segment, a second arm segment, and an indentation segment.

The present invention may be manufactured using conventional injection molding techniques. In one embodiment, the first and second bridge wire end segments are embedded within the first and second lens portions, respectively. Use of curved or bent bridge wire end segments, in conjunction with adequately controlling the distance between bridge wire end segments and the edges of the lens portions, may ensure that the position of the bridge wire relative to the lens portions is essentially identical from one pair of eyeglasses to another.

The bridge wire's indentation segment comprises an indented region along the bridge wire's length. In one embodiment, the indentation segment comprises a generally u-shaped indentation located midway between the first and second end segments. The indentation segment may enhance ease of manufacturability be providing a holding region for securing the bridge wire during a manufacturing process. The indentation segment may additionally enhance the bridge wire's lateral stability, as well as aid in securing the eyeglasses to a wearer's nose.

BRIEF DESCRIPTION OF THE DRAWINGS

FIG. 1 is a frontal view of a pair of highly-compact eyeglasses constructed in accordance with the present invention.

FIG. 2 is a frontal view of a first lens portion.

FIG. 3 is a cross-sectional view of an exemplary first lens portion.

FIGS. 4A, 4B, and 4C are frontal views of exemplary bridge wires.

FIG. 5 is a schematic diagram showing dimensions for an exemplary pair of highly compact eyeglasses.

DETAILED DESCRIPTION

FIG. 1 is a frontal view of a pair of highly-compact eyeglasses 10 constructed in accordance with the present invention. The eyeglasses 10 comprise a first 100 and a second 110 lens portion that are coupled via a bridge member or wire 500. The eyeglasses 10 are characterized by thin lens portions 100, 110; ease of adjustability; secure fit; durability; ease of manufacturability; and low cost. Eyeglasses 10 of the type described herein may be stored inside a wallet, or essentially any small carrier suitable for transporting an object having a length, a width, and/or a thickness approaching or approximating that of a typical credit card.

In the description that follows, various portions or elements of the present invention may be described and/or depicted as having particular dimensions and/or characteristics. Those skilled in the art will recognize that such dimensions and/or characteristics may be exemplary and/or particular to specific embodiments, and that a wide range of embodiments having various dimensions and/or characteristics may be possible.

A. Lens Portions

In one embodiment, the first and second lens portions 100, 110 are right- and left-side versions of each other. Hence, those skilled in the art will readily understand that design, manufacturing, and/or performance considerations associated with the first lens portion 100 may also be applicable to the second lens portion 110.

FIG. 2 is a frontal view of a first lens portion 100 constructed in accordance with the present invention. In one embodiment, the first lens portion 100 comprises a single piece of material having an optical section or region 200 and a transition section or region 300. The optical section 200 provides the first lens portion 100 with desired refractive, magnifying, and/or light-focusing characteristics or capabilities. The transition section 300 serves as an interface between the optical section 200 and the bridge wire 500, and also provides the first lens portion 100 with enhanced gripping abilities to ensure a secure fit against a wearer's nose. Each element comprising the first lens portion 100 is described in greater detail hereafter.

FIG. 3 is a cross-sectional view of an exemplary first lens portion 100 constructed in accordance with the present invention, which provides a dioptic power of 1.25. In the embodiment shown in FIG. 3, the optical section 200 comprises a single piece of material characterized by a reference surface 210 and an adjustment surface 220. The reference surface 210 comprises a cross-section of a first sphere having a reference curvature. The reference surface's curvature may remain the same regardless of the optical section's refractive characteristics. The adjustment surface 220 comprises a cross-section of a second sphere, where the curvature of the second sphere is designed or selected in accordance with providing the optical section 200 with desired refractive characteristics. As the curvature of the adjustment surface 220 varies to provide target refractive characteristics, the thickness of the optical section 200 correspondingly changes.

In the exemplary embodiment shown in FIG. 3, the curvature of the reference surface 210 corresponds to a spherical section associated with a spherical radius of 2.884 inches, or a dioptic power of 8.00, using conventional polycarbonate material. To provide an optical section 200 characterized by an overall dioptic power of 1.25, the adjustment surface 220 corresponds to a spherical section associated with a spherical radius of 3.418 inches, or 6.75 diopters. Those skilled in the art will understand that the aforementioned radii or, equivalently, dioptic powers, may vary in accordance with a given dioptic power desired. Thus, for example, the curvature of the adjustment surface 220 may be varied or chosen relative to that of the reference surface 210 to provide an overall dioptic power of 1.50, 1.75, 2.00, 2.25, or 2.50 diopters. Those skied in the art will further understand that the aforementioned radii or dioptic powers may also differ in accordance with the type of material from which the lens portion 100, 110 is constructed. Those skilled in the art will additionally recognize that standard optical techniques or calculations may be used to determine the spherical section dimensions required to achieve essentially any target dioptic power for a given material from which the lens portion 100, 110 is manufactured.

The transition section 300 may serve as an interface between the optical section 200 and the bridge wire 500, and may ensure that the first lens portion 100 fits snugly against a wearer's nose. In one embodiment, the transition section 300 comprises a single piece of material that is contiguous with the optical section 200. In other words, the transition section 300 and the optical section 200 may be formed from or in a single piece of material, such as a conventional polycarbonate material. This in turn may greatly simplify the manufacturing process and advantageously reduce cost. Those skilled in the art will recognize that in alternate embodiments, a lens portion 100, 110 could comprise another type of material, and/or the optical section 200 and the transition sections 300 may comprise different materials.

In one embodiment, the transition section 300 includes an upper surface 310, a lower surface 320, and an edge 330. Regardless of the optical characteristics of the lens portion 100, the thickness of the lens portion 100 as measured from the lower surface 320 of the transition section 300 to the top or peak of the reference surface 210 may remain constant, as indicated in FIG. 3. Thus, the thickness of the lens portions 100, 110, as measured from a transition region's lower surface 320 to the peak of a reference surface 210, may be independent of the lens portion's refractive or magnifying properties.

The upper surface 310 may include a lip or rim 312, which aids in providing a secure grip between the first lens portion 100 and a wearer's nose. Placement of the lip 312 on the upper surface 310 may be more effective than having the lip 312 reside upon the lower surface 320. Referring also now to FIG. 2, the transition section's edge 330 may include a roughened segment or corrugation 332 along at least a portion of its length. The corrugation 332 increases the lens portion's contact area against a wearer's nose, and hence increases friction to further facilitate non-slip, yet comfortable, contact. The lip 312 and the corrugation 332 may advantageously eliminate the need for nose pads found on other types of eyewear, thereby enhancing the compactness and durability of the present invention.

In an exemplary embodiment, the first and second lens portions 100, 110 are comprised of conventional polycarbonate material, and are fabricated using conventional injection molding techniques.

B) Bridge Wire

The bridge wire 500 facilitates adjustment of the distance between the first and second lens portions 100, 110, and helps support the eyeglasses 10 upon a wearer's nose. FIGS. 4A, 4B, and 4C are frontal views of exemplary bridge wires 500 constructed in accordance with the present invention. In one embodiment, the bridge wire 500 comprises a portion, section, or segment of a thin wire having a generally circular or elliptical cross-section, and which includes a first end segment 502, a first arm segment 504, a second end segment 506, a second arm segment 508, and an indentation segment 510. Additionally, the bridge wire 500 may be a single piece of wire that is somewhat or generally m-shaped. Those skilled in the art will recognize that various bridge wire shapes and/or material compositions may be possible in alternate embodiments.

The bridge wire 500 essentially functions as an adjustable flat spring that couples or interconnects the first and second lens portions 100, 110. As the bridge wire 500 exhibits spring-like characteristics, it retains a memory relative to displacement about or around to a default position. When the eyeglasses 10 reside upon a wearer's nose, the distance between the bridge wire's first and second end segments 502, 506 typically increases relative to that in the default position. Removal of the eyeglasses 10 may cause the bridge wire 500 to essentially return to its default position. A predetermined or as-manufactured default position may be selected to accommodate a wide variety of facial types; alternatively, a wearer may adjust the eyeglasses 10 such that the bridge wire 500 exhibits a new and/or different default position. Hence, the default position may be adjusted or changed via bending or moving the bridge wire 500 past a certain point, allowing a wearer to easily adjust the eyeglasses 10 to further customize fit, if necessary. The spring-like behavior of the bridge wire 500 may also serve to enhance the eyeglasses' damage resistance.

In one embodiment, the first and second end segments 502, 506 comprise terminal portions of the bridge wire 500 that are bent, curved, and/or looped relative to the first and second arm segments 504, 508, respectively. The eyeglasses 10 of the present invention may be manufactured via an injection molding process. Thus, the first and second end segments 502, 506, as well as portions of the first and second arm segments 504, 508, may be embedded or encapsulated within the first and second lens portions 100, 110 during manufacture. It may be important to ensure that the positions of the first and second end segments 502, 506 remain essentially constant throughout the manufacturing process, and hence from one pair of eyeglasses 10 to another. This may be facilitated through a) the use of bent, curved, and/or curled end segments 502, 506, rather than a bridge wire 500 having completely or essentially straight ends; and/or b) keeping the distance between a given end segment 502, 506 and the edge 330 or boundary of a lens portion's transition region 300 small. The first and second end segments 502, 506 may further enhance the eyeglasses' lateral strength, thereby increasing durability.

Those skilled in the art will recognize that depending upon embodiment, one or more sections of the bridge wire 500 may not be embedded within the lens portions 100, 110 during manufacture. In such embodiments, an end segment 502, 506 may attach to the surface of a lens portion 100, 110, where the lens portion 100, 110 may include a receiving member or similar structure to facilitate such attachment.

The indentation segment 510 comprises a recessed or indented region or section of the bridge wire 500 located approximately or essentially midway between the first and second end segments 502, 506. The indentation segment 510 may ensure ease of manufacturability by providing a secure holding region for the bridge wire 500 during a manufacturing process. This can be quite important when a high-pressure injection molding process is employed, in which case the indentation segment 510 may serve as a mechanism by which the bridge wire 500 may be securely held or positioned in a manufacturing mold. The indentation segment 510 additionally enhances the lateral stability of the bridge wire 500, and may aid in securing the eyeglasses 10 to a wearer's nose. In one embodiment, the indentation segment 510 is generally u-shaped. Those skilled in the art will recognize that the indentation segment 510 may have a w or other type of shape in an alternate embodiment.

The bridge wires 500 shown in FIGS. 4A through 4C can readily accommodate a wide variety of variation in facial characteristics. Those skilled in the art will understand that bridge wires 500 having different curvatures and/or dimensions may be employed to accommodate essentially any type of facial features. In an exemplary embodiment, the bridge wire 500 is comprised of type 302 spring-tempered, full-hardness stainless steel wire, having a diameter of approximately 18 mils. Furthermore, the first and second end segments 502, 506 may be bent at angles of +40 and −40 degrees, respectively, relative to the first and second arm segments 504, 508. The first and second end segments 502, 504 may be approximately 0.070 inches long, and the entire length of the bridge wire 500 may be approximately 1.35 inches. Additionally, the distance between a given end segment 502, 506 and a lens portion's edge 330 may be between approximately 0.125 and 0.150 inches. In alternate embodiments, the first and/or second end segments 502, 504 may be dimensioned differently and/or bent, curled, and/or looped differently from and/or opposite to the directions shown in FIGS. 4A through 4C.

C) Additional Features and Exemplary Eyeglass Dimensions

FIG. 5 is a schematic diagram showing dimensions for an exemplary pair of highly compact eyeglasses 10 constructed in accordance with the present invention. An important design parameter may be the angle between the edge 330 of a lens portion's transition region and a vertical axis that bisects the bridge wire 500. The extent of this angle influences the fit of the eyeglasses 10 against a wearer's nose, and is chosen to accommodate a wide range of variation for one or more facial types. In one embodiment, this angle equals 4.00 degrees. Those skilled in the art will recognize that multiple versions of the eyeglasses 10 could be designed and manufactured with angles and/or dimensions chosen to best accommodate a particular set of facial types.

While the present invention has been described with reference to particular embodiments, those skilled in the art will understand that various modifications may be provided. For example, the first and second lens portions 100, 110 may not be exact right- and left-side versions of each other. As another example, a lens portion 100, 110 may be essentially entirely comprised of an optical section, having little or no transition section. In such an embodiment, the bridge wire 500 may be embedded within the optical section, and the optical section may include a lip and/or corrugation in a manner analogous to that described above for the transition section. As another example, the bridge wire 500 may be attached to the outside of one or both lens portions 100, 110 rather than embedded within during an injection molding or other type of manufacturing process; or the bridge wire 500 could extend further along and/or within a lens portion. As yet another example, the bridge wire 500 may not be a single piece of wire, but may be comprised of two or more wire segments. Additionally, one or more portions of the bridge wire 500 may be implemented using materials other than wire. The description herein provides for these variations, as well as others, and is limited only by the following claims.

What is claimed is:

1. Molded eyeglasses comprising:
   a first lens portion;
   a second lens portion; and
   a bridge member partially embedded in the first and second lens portions, the bridge member characterized by a first radius of curvature proximate the first and second lens portions, a second radius of curvature approximately midway between the first and second lens portions, and a third radius of curvature between the first and second radii of curvature, wherein the third radius of curvature is less than the first and second radii of curvature.

2. The eyeglasses of claim 1, wherein the bridge member comprises a wire.

3. The eyeglasses of claim 2, wherein the bridge member comprises a single wire.

4. The eyeglasses of claim 3, wherein the bridge member is comprised of type 302 spring-tempered full hard stainless steel wire.

5. The eyeglasses of claim 1, wherein the bridge wire comprises a wire exhibiting positional memory characteristics relative to a default position.

6. The eyeglasses of claim 1, wherein the bridge member acts in a spring-like manner relative to displacement of the lens portions about a default position.

7. The eyeglasses of claim 1, wherein the bridge member includes a first bent end segment.

8. The eyeglasses of claim 7, wherein the first bent end segment is embedded within the first lens portion.

9. The eyeglasses of claim 7, wherein the eyeglasses are manufactured via an injection molding process.

10. The molded eyeglasses of claim 1, wherein the bridge member comprises a wire having one from a group of a circular, an elliptical, and a polygonal cross section.

11. The eyeglasses of claim 1, wherein the first lens portion includes a corrugated region for providing enhanced grip against a wearer's nose.

12. The eyeglasses of claim 1, wherein the first lens portion comprises an optical portion having a reference surface and an adjustment surface.

13. The eyeglasses of claim 12, wherein the curvature of the reference surface is essentially identical from one pair of eyeglasses to another.

14. The eyeglasses of claim 13, wherein the curvature of the adjustment surface varies in accordance with a dioptic power associated with the first lens portion.

15. The eyeglasses of claim 1, wherein the first lens portion comprises an optical portion and a transition portion.

16. The eyeglasses of claim 15, wherein the optical portion includes a reference surface and an adjustment surface, and wherein the transition portion includes a lower surface and an upper surface.

17. The eyeglasses of claim 16, wherein a distance between the transition portion's lower surface and a peak of the optical portion's reference surface is independent of a dioptic power associated with the optical portion.

18. The eyeglasses of claim 15, wherein the transition portion includes an edge having a corrugated region that aids in securing the first lens portion to a wearer's nose.

19. The eyeglasses of claim 15, wherein the transition portion includes an upper surface having a lip that aids in securing the first lens portion to a wearer's nose.

20. The eyeglasses of claim 1, wherein the first lens portion comprises a polycarbonate material.

21. Molded eyeglasses comprising:
    a first lens portion;
    a second lens portion; and
    a bridge member comprising:
        a first arm segment partially embedded in the first lens portion, the first arm segment characterized by a first radius of curvature;
        a second arm segment partially embedded in the second lens portion, the second arm segment characterized by the first radius of curvature;
        an indentation segment formed between the first and second arm segments, the indentation segment characterized by a second radius of curvature; and
        a first and a second corner portion, each corner portion characterized by a third radius of curvature, the first and second corner portions respectively joining the first and second arm segments to the indentation segment.

22. The molded eyeglasses of claim 21, wherein the third radius of curvature is less than the first and second radii of curvature.

23. Molded eyeglasses comprising:
    a first lens portion;
    a second lens portion; and
    a bridge member comprising:
        a first and a second bent segment respectively facilitating secure coupling of the bridge member to the first and second lens portions;
        a first arm segment characterized by a first radius of curvature;
        a second arm segment characterized by the first radius of curvature;
        an indentation segment formed between the first and second arm segments, the indentation segment characterized by a second radius of curvature; and
        a first and a second corner portion, each corner portion characterized by a third radius of curvature, the first and second corner portions respectively joining the first and second arm segments to the indentation segment.

24. A bridge member for coupling a first eyeglass lens and a second eyeglass lens, the bridge member comprising:
    a first and a second bent segment respectively positioned proximate a first and a second end of the bridge member;
    a first arm segment characterized by a first radius of curvature;
    a second arm segment characterized by the first radius of curvature;
    an indentation segment formed between the first and second arm segments, the indentation segment characterized by a second radius of curvature; and
    a first and a second corner portion, each corner portion characterized by a third radius of curvature, the first and second corner portions respectively joining the first and second arm segments to the indentation segment.

25. The bridge member of claim 24, wherein the direction of the second radius of curvature is opposite to that of the first radius of curvature.

26. The bridge member of claim 24, wherein the bridge member comprises a wire having one from a group of a circular, an elliptical, and a polygonal cross section.

27. A bridge member for coupling a first eyeglass lens and a second eyeglass lens, the bridge member comprising:
    a first and a second bent segment respectively positioned proximate a first and a second end of the bridge member;
    a first and a second arm segment each characterized by a first shape, the first arm segment adjacent to the first bent segment, the second arm segment adjacent to the second bent segment;
    a third arm segment characterized by a second shape; and
    a first corner portion joining the third arm segment to the first arm segment; and
    a second corner portion joining the third arm segment to the second arm segment, wherein each corner portion corresponds to an intersection between the first shape and the second shape.

28. The bridge member of claim 27, wherein the third arm segment is positioned approximately midway between the first and second arm segments.

* * * * *